US012692688B2

(12) United States Patent
Wales

(10) Patent No.: US 12,692,688 B2
(45) Date of Patent: Jul. 28, 2026

(54) MECHANICAL FILTER SWITCH

(71) Applicant: Delta Faucet Company, Indianapolis, IN (US)

(72) Inventor: Joshua Drew Wales, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 232 days.

(21) Appl. No.: 18/691,724

(22) PCT Filed: Sep. 15, 2022

(86) PCT No.: PCT/US2022/043637
§ 371 (c)(1),
(2) Date: Mar. 13, 2024

(87) PCT Pub. No.: WO2023/043905
PCT Pub. Date: Mar. 23, 2023

(65) Prior Publication Data
US 2025/0122703 A1     Apr. 17, 2025

Related U.S. Application Data

(60) Provisional application No. 63/244,359, filed on Sep. 15, 2021.

(51) Int. Cl.
*E03C 1/04*          (2006.01)
*F16K 11/044*          (2006.01)
(Continued)

(52) U.S. Cl.
CPC .............. *E03C 1/04* (2013.01); *F16K 11/044* (2013.01); *F16K 31/465* (2013.01); *E03C 2001/026* (2013.01); *E03C 2201/40* (2013.01)

(58) Field of Classification Search
CPC ........ E03C 1/04; E03C 1/023; E03C 2201/40; F16K 11/02; F16K 11/04; F16K 11/044; F16K 31/465
See application file for complete search history.

(56) References Cited

U.S. PATENT DOCUMENTS 3,192,952 A     7/1965  Botnick
4,250,920 A  *  2/1981  Traylor ................. F16K 11/044
                                                                137/625.5
(Continued)

FOREIGN PATENT DOCUMENTS

CN          212273129          1/2021
EP          2845957          3/2015
(Continued)

OTHER PUBLICATIONS

Home Depot, Hot Water Tank and Filtration System for Hot Water Dispensers, retrieved on Jun. 10, 2021 from https://www.homedepot.com/p/InSinkErator-Hot-Water-Tank-and-Filtration-System-for-Hot-Water-Dispensers-HWT-F1000S/204400247, 9 pages.
(Continued)

*Primary Examiner* — Reinaldo Sanchez-Medina
(74) *Attorney, Agent, or Firm* — Bose McKinney & Evans LLP

(57)          ABSTRACT
A mechanical filter switch for use with a faucet including a valve piston assembly received within a diverter body for controlling the flow of cold water to a water filter.

40 Claims, 11 Drawing Sheets

(51) Int. Cl.
    *F16K 31/46*        (2006.01)
    *E03C 1/02*         (2006.01)

(56) References Cited

U.S. PATENT DOCUMENTS

| | | | |
|---|---|---|---|
| 4,515,692 A | 5/1985 | Chandler et al. | |
| 4,698,860 A | 10/1987 | Hafner et al. | |
| 4,918,426 A | 4/1990 | Butts et al. | |
| 5,057,214 A | 10/1991 | Morris | |
| 5,545,322 A | 8/1996 | Cheng | |
| 6,058,971 A | 5/2000 | Palmer et al. | |
| 6,065,694 A | 5/2000 | d'Alayer de Costemore d'Arc | |
| 7,261,127 B1 * | 8/2007 | Oundjian | F16K 3/246 |
| | | | 137/625.5 |
| 7,303,666 B1 | 12/2007 | Mitsis | |
| 7,753,074 B2 | 7/2010 | Rosko et al. | |
| 8,343,338 B2 * | 1/2013 | Schmitt | F16K 11/10 |
| | | | 210/321.6 |
| 8,479,771 B2 | 7/2013 | Campbell et al. | |
| 8,968,568 B2 | 3/2015 | Armour | |
| 9,328,485 B2 | 5/2016 | Shaffer | |
| 9,409,758 B2 | 8/2016 | McHale et al. | |
| 9,528,249 B2 | 12/2016 | Gompper | |
| 9,739,039 B2 | 8/2017 | Chang | |
| 9,932,724 B2 * | 4/2018 | Chan | F16K 49/005 |
| 10,227,758 B2 | 3/2019 | Tang | |
| 10,450,203 B2 | 10/2019 | Schuster | |
| 10,472,252 B2 | 11/2019 | Schuster | |
| 10,640,393 B2 | 5/2020 | Cobb et al. | |
| 10,675,573 B2 | 6/2020 | Miller et al. | |
| 10,830,493 B2 | 11/2020 | Jeon et al. | |
| 10,894,727 B2 | 1/2021 | Yu et al. | |
| 10,947,138 B2 | 3/2021 | Rosko et al. | |
| 11,001,509 B2 | 5/2021 | Schuster | |
| 12,018,469 B2 | 6/2024 | Soberano et al. | |
| 2005/0092665 A1 | 5/2005 | Kirchner | |
| 2012/0168000 A1 | 7/2012 | Gioira et al. | |
| 2013/0112903 A1 | 5/2013 | Conan et al. | |
| 2014/0151280 A1 | 6/2014 | Shaffer | |
| 2014/0190582 A1 | 7/2014 | Shaffer | |
| 2017/0327386 A1 | 11/2017 | Chen et al. | |
| 2020/0048109 A1 | 2/2020 | Schuster | |
| 2020/0299941 A1 | 9/2020 | Veros et al. | |
| 2020/0326734 A1 | 10/2020 | Rodenbeck et al. | |
| 2022/0098837 A1 | 3/2022 | Pitsch et al. | |
| 2023/0331537 A1 | 10/2023 | Nuttall et al. | |

FOREIGN PATENT DOCUMENTS

| | | |
|---|---|---|
| WO | WO 2017/135429 | 8/2017 |
| WO | WO 2020/167717 | 8/2020 |
| WO | 2023/043905 | 3/2023 |
| WO | 2023233320 | 12/2023 |
| WO | 2024011624 | 1/2024 |

OTHER PUBLICATIONS

Home Depot, Strainer with Push Button Release Mechanism with Optional Brushed Nickel or Chrome Buttons, retrieved on Jun. 10, 2021 from https://www.homedepot.com/p/Glacier-Bay-Strainer-with-Push-Button-Release-Mechanism-with-Optional-Brushed-Nickel-or-Chrome-Buttons-7043-207SS/207144317, 8 pages.

PCT International Search Report and Written Opinion, International Application No. PCT/US2022/043637, Nov. 29, 2022, 25 pages.

Culligan, Clearlink Pro Home Under Sink Water Filter Wireless Accessory, retrieved on May 28, 2021 from https://www.culligan.com/product/clearlink-pro-home-under-sink-water-filter-wireless-accessory, 9 pages.

The Home Depot, Under Sink Dual Flow Water Filtration System, retrieved on May 28, 2021 from https://www.homedepot.com/p/GE-Under-Sink-Dual-Flow-Water-Filtration-System-GXK285JBL/206501304, 10 pages.

3M Aqua-Pure, White 70020007418 Under Sink Full Flow Water Filter System AP200, 5528901, available at least as early as Jun. 2021, 10 pages.

Brita Basic Faucet Water Filter System, Chrome, 1 Count, available at least as early as Jun. 2021, 12 pages.

* cited by examiner

1

MECHANICAL FILTER SWITCH

CROSS-REFERENCE TO RELATED APPLICATION

The present application is a 371 U.S. National Phase of PCT International Application No. PCT/US22/43637, filed Sep. 15, 2022, which claims priority to U.S. Provisional Patent Application Ser. No. 63/244,359, filed Sep. 15, 2021, the disclosures of which are expressly incorporated herein by reference.

BACKGROUND AND SUMMARY OF THE INVENTION

The present invention relates generally to a water diverter device and, more particularly, to a mechanical filter switch for selectively delivering filtered water from a faucet.

It is known to provide various under-sink filtration devices that utilize a dedicated drinking or filtered water faucet. More particularly, hot water is illustratively bad for filters (e.g., can damage filters and/or release toxins). As such, filters are typically placed in fluid communication only with a cold water line. Such a dedicated filtered water faucet, in addition to a conventional kitchen faucet, may not be desired since it adds visual clutter and/or requires additional holes be cut into the countertop for mounting. As such, many users desire that their traditional kitchen faucet also be a source of filtered water.

However, such an integrated design may include certain limitations. First, the high flow rate of typical kitchen faucets require very large filters for high quality filtration. Additionally, the large amount of water used by a standard kitchen faucet would likely require frequent filter replacement. Furthermore, if the user does not remember to ensure that the faucet is only using exclusively cold water (e.g., in the case of a single handle faucet ensuring that the valve handle is in the full cold water position) then the faucet could deliver a mixture of unfiltered hot water with filtered cold water. This may happen easily and without any warning to the user of conventional kitchen faucets (e.g., with both under sink filters and switching devices). The illustrative device of the present invention turns off the hot water to ensure that when a user selects to activate filtered water, then only filtered cold water is delivered by the faucet.

According to an illustrative embodiment of the present disclosure, a water diverter device includes a diverter body having a hot water chamber, a cold water chamber blocked from the hot water chamber, a hot water inlet in fluid communication with the hot water chamber, a hot water outlet in fluid communication with the hot water chamber, a cold water inlet in fluid communication with the cold water chamber, a cold water outlet in fluid communication with the cold water chamber, and a filter water outlet in fluid communication with the cold water chamber, and a filter water outlet in fluid communication with the cold water chamber. A valve piston includes a hot water valve member and a cold water valve member, the hot water valve member being received within the hot water chamber, and the cold water valve member being received within the cold water chamber. An actuator is operably coupled to the valve piston, and a user interface is operably coupled to the actuator, wherein an input to the user interface causes the actuator to move the valve piston.

According to a further illustrative embodiment of the present disclosure, a water diverter device includes a diverter body having a hot water inlet, a hot water outlet in selective communication with a hot water inlet, a cold water inlet, a cold water outlet in selective fluid communication with a cold water inlet, and a filter water outlet in selective fluid communication with the cold water inlet. A valve piston includes a first position wherein the hot water inlet is in fluid communication with the hot water outlet, the cold water inlet is in fluid communication with the cold water outlet, and the cold water is blocked from the filtered water outlet. The valve piston also includes a second position wherein the hot water inlet is blocked from the hot water outlet, the cold water inlet is blocked from the cold water outlet, and the cold water inlet is in fluid communication with the filtered water outlet.

According to another illustrative embodiment of the present disclosure, a faucet includes a delivery spout having a faucet outlet, and a diverter body having a hot water inlet, a hot water outlet in selective communication with the hot water inlet, a cold water inlet, a cold water outlet in selective fluid communication with the cold water inlet, and a filtered water outlet in selective fluid communication with the cold water inlet. A valve piston includes a first position wherein the hot water inlet is in fluid communication with the hot water outlet, the cold water inlet is in fluid communication with the hot water outlet, the cold water inlet is in fluid communication with the cold water outlet, and the cold water inlet is blocked from the filtered water outlet. The valve piston further includes a second position wherein the hot water inlet is blocked from the hot water outlet, the cold water inlet is blocked from the cold water outlet, and the cold water inlet is in fluid communication with the filtered water outlet. The hot water outlet, the cold water outlet, and the filtered water outlet are fluidly coupled to the faucet outlet. An actuator is operably coupled to the valve piston, and a user interface is operably coupled to the actuator wherein input to the user interface causes the actuator to move the valve piston. A water filter is fluidly coupled between the filtered water outlet and the faucet outlet.

According to a further illustrative embodiment of the present disclosure, a water diverter device includes a diverter body including a cold water chamber, a cold water inlet in fluid communication with the cold water chamber, a cold water outlet in fluid communication with the cold water chamber, and a filter water outlet in fluid communication with the cold water chamber. A valve piston assembly includes a cold water valve member received within the cold water chamber. An actuator is operably coupled to the valve piston assembly. A user interface is operably coupled to the actuator, wherein input to the user interface causes the actuator to move the valve piston assembly. The valve piston assembly includes a first position wherein the cold water inlet is in fluid communication with the cold water outlet, the hot water inlet is in fluid communication with the hot water outlet, and the filter water port is blocked from the cold water inlet, the cold water outlet and the hot water inlet. The valve assembly includes a second position wherein the cold water inlet is blocked from the cold water outlet, and the hot water inlet is blocked from the hot water outlet. The valve piston assembly is biased toward the first position.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description of exemplary embodiments when taken in conjunction with the accompanying drawings, wherein.

Figure 1:
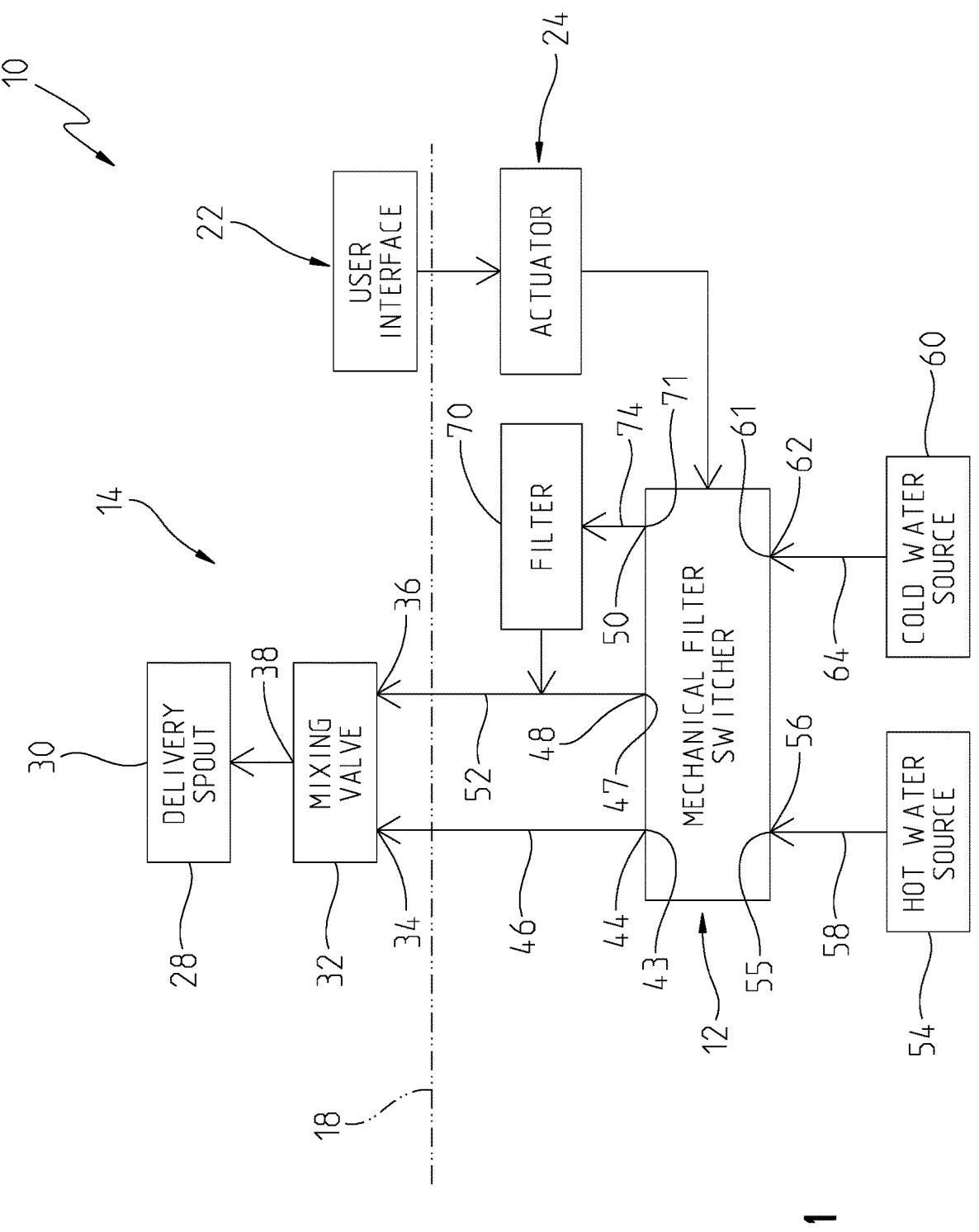
FIG. 1 is a block diagram of an illustrative water filtration system of the present disclosure.

Corresponding reference characters indicate corresponding parts throughout the several views. Although the drawings represent exemplary embodiments of the various features and components according to the present disclosure, the drawings are not necessarily to scale and certain features may be exaggerated in order to better illustrate exemplary embodiments of the invention, and such exemplifications are not to be construed as limiting the scope of the invention in any manner.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 2:
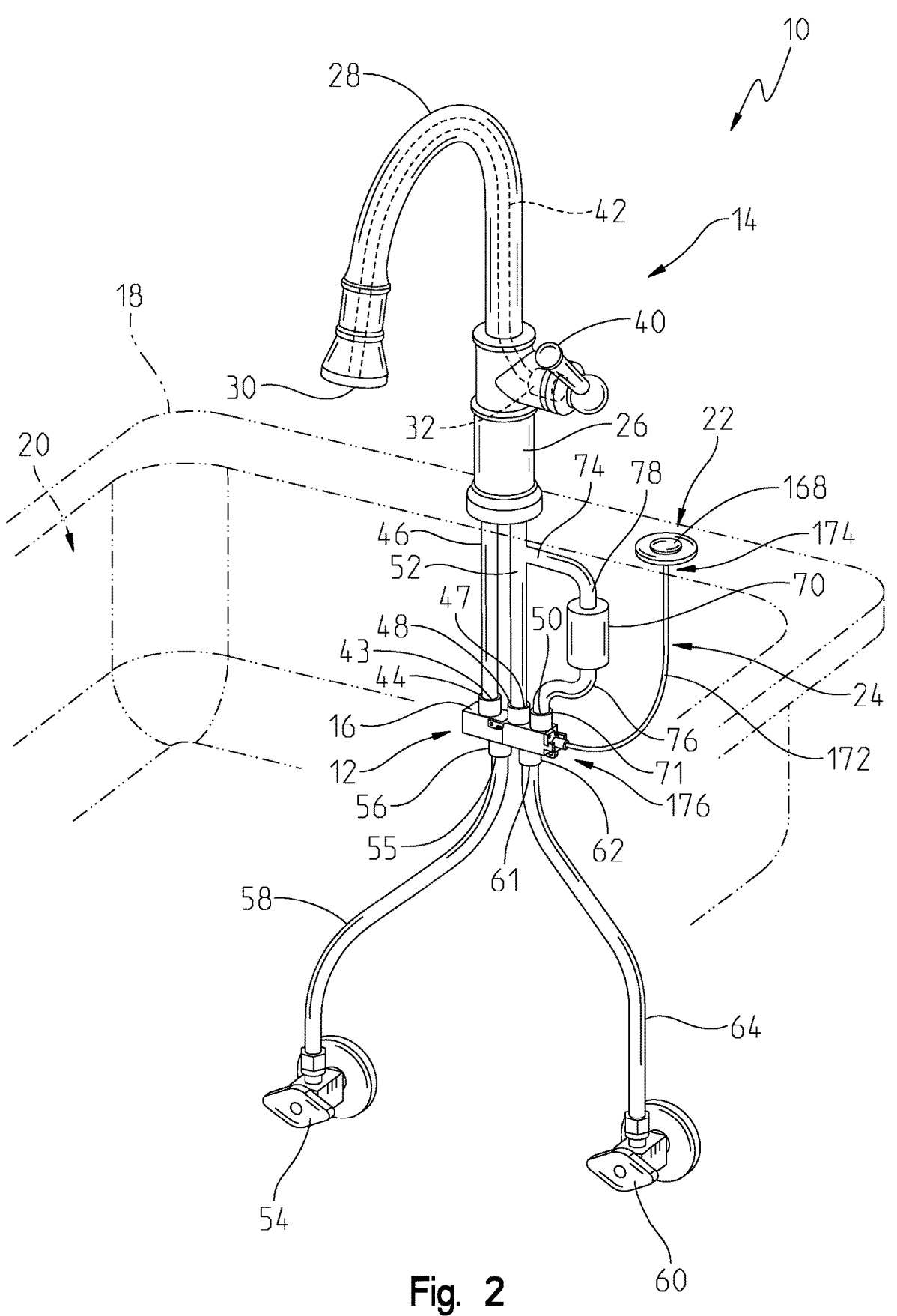
FIG. 2 is a perspective view of the water filtration system of FIG. 1, showing a mounting deck and a sink basin in phantom.

Referring initially to FIGS. 1 and 2, an illustrative water filtration system 10 of the present disclosure includes a water diverter device 12 for use with a faucet 14. Illustratively, the water diverter device 12 is a mechanical filter switch including a diverter body 16 supported below a mounting deck 18 (e.g., a sink deck), while the faucet 14 is supported above the mounting deck 18. The mounting deck 18 illustratively supports a sink basin 20. A user interface 22 is illustratively operably coupled to an actuator 24 for controlling the water diverter device 12.

The faucet 14 illustratively includes a hub 26 coupled to the mounting deck 18 and supporting a delivery spout 28 having a water outlet 30. A manual valve, illustratively a mixing valve 32, is fluidly coupled to the water outlet 30. More particularly, the mixing valve 32 includes a hot water inlet port 34 and a cold water inlet port 36 in selective fluid communication with an outlet port 38. The mixing valve 32 may be of conventional design as including a moveable valve member (not shown) operably coupled to a handle 40 to control the flow of water from the hot water inlet port 34 and the cold water inlet port 36 to the outlet port 38, thereby controlling the flow rate and/or the temperature of water supplied to the water outlet 30. The mixing valve 32 may be of the type further detailed in U.S. Pat. No. 7,753,074 to Rosko et al., the disclosure of which is expressly incorporated herein by reference. A passageway 42, illustratively defined by a flexible tube, may couple the outlet port 38 of the mixing valve 32 to the water outlet 30 of the delivery spout 28.

The hot water inlet port 34 of the mixing valve 32 is fluidly coupled to a first port 43 of the diverter body 16 (defining a hot water outlet 44) via a first connection tube 46, and the cold water inlet port 36 of the mixing valve 32 is fluidly coupled to a second port 47 of the diverter body 16 (defining a cold water outlet 48) via a second connection tube 52. A hot water source 54 (e.g., a hot water valve stop) is fluidly coupled to a third port 55 of the diverter body 16 (defining a hot water inlet 56) via a hot water supply tube 58, and a cold water source 60 (e.g., a cold water valve stop) is fluidly coupled to a fourth port 61 of the diverter body 16 (defining a cold water inlet 62) via a cold water supply tube 64.

Illustratively, a water filter device 70 is in fluid communication downstream from the diverter device 12. More particularly, the water filter device 70 is in selective fluid communication with a fifth port 71 of the diverter body 16 (defining a filter water port or outlet 50 of the diverter device 12) via a bypass filter line 74, such that the water filter device 70 is fluidly coupled in series between the filter water outlet 50 and the water outlet 30. The bypass filter line 74 is illustratively in parallel with the second connection tube 52 and includes an upstream tube portion 76 and a downstream tube portion 78 fluidly coupled to opposing ends of the water filter device 70. More particularly, the upstream tube portion 76 is fluidly coupled to the filter water outlet 50 of the diverter body 16, and the downstream tube portion 78 is fluidly coupled to the cold water inlet 36 of the mixing valve 32 via the connection tube 52 (FIG. 2). The water filter device 70 may be of conventional design, such as a 3 stage water filter. An illustrative water filter device 70 may be an Aqua-Pure water filter available from the 3M Company of Maplewood, Minnesota (USA).

Figure 3:
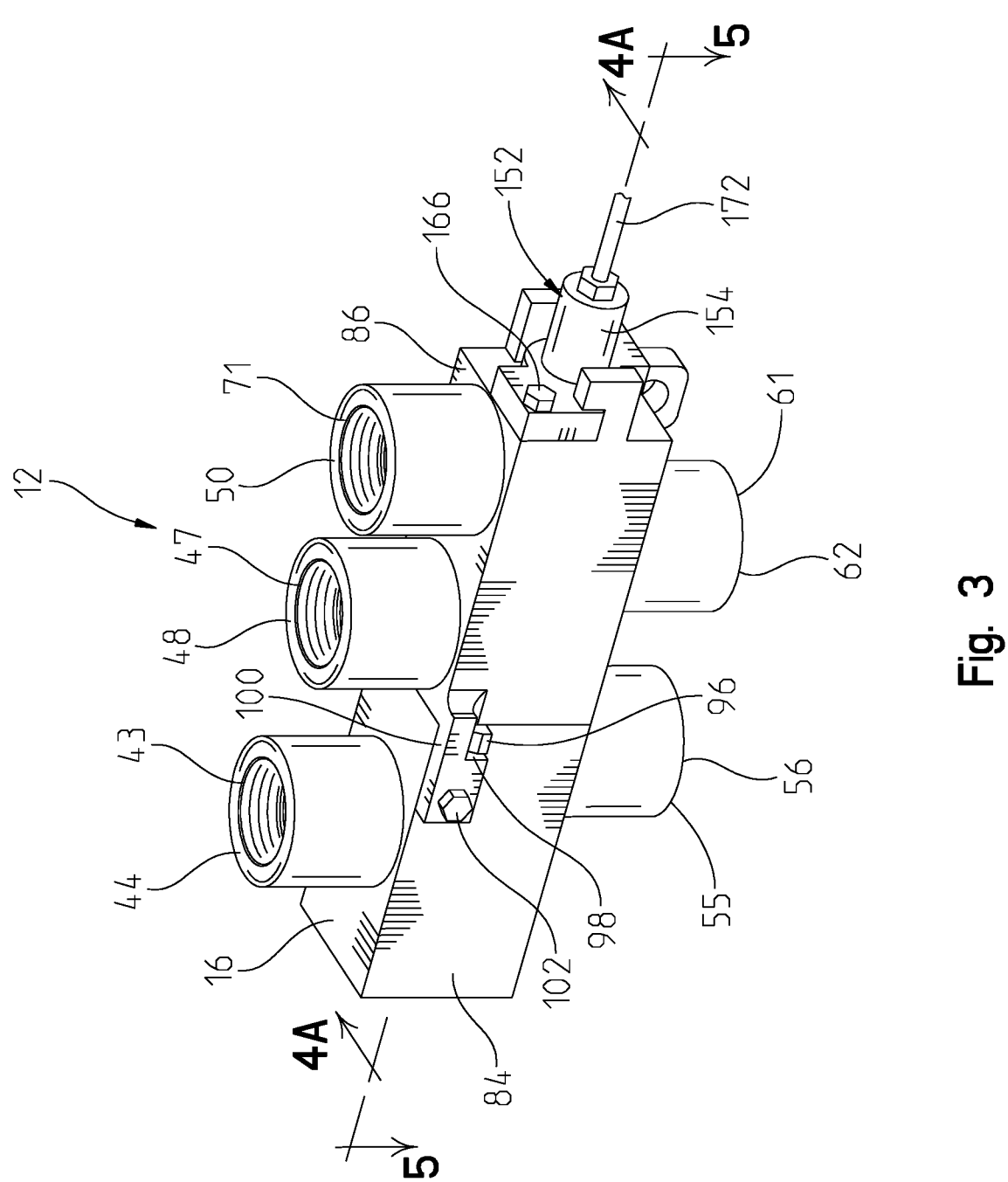
FIG. 3 is a perspective view of an illustrative water diverter device of the water filtration system of FIG. 2.
Figure 4A:
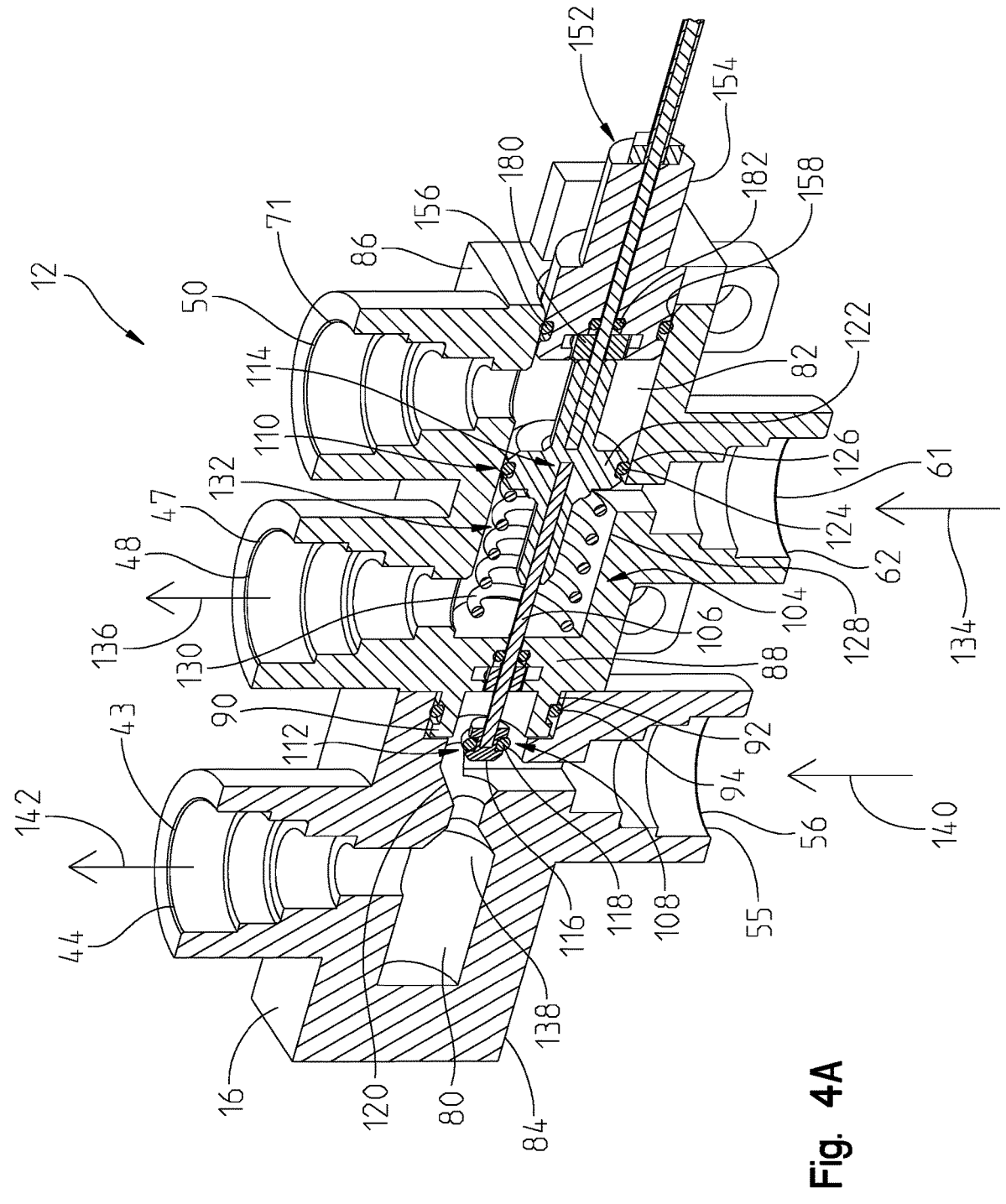
FIG. 4A is a cross-sectional view taken along line 4A-4A of FIG. 3, showing the valve piston assembly in a first position defining a normal or default mode of operation, such that a hot water inlet and a cold water inlet of the diverter body are in fluid communication with a hot water outlet and a cold water outlet of the diverter body.
Figure 4B:
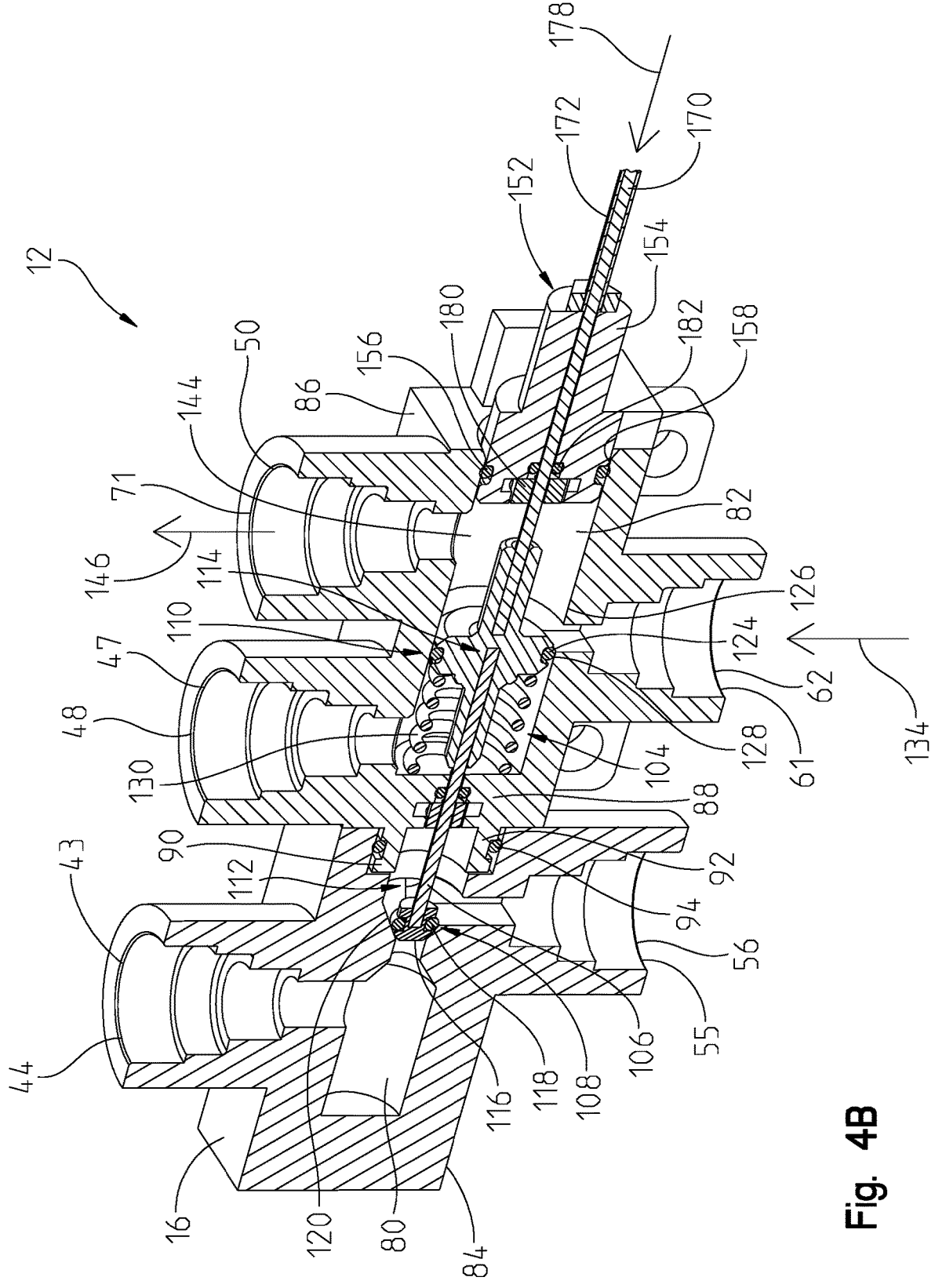
FIG. 4B is a cross-sectional view similar to FIG. 4A, showing the valve piston assembly in a second position defining a filtered mode of operation, such that the hot water inlet is blocked from the hot water outlet of the diverter body, the cold water inlet is blocked from the cold water outlet, and the cold water inlet is in fluid communication with a filter water outlet of the diverter body.
Figure 5:
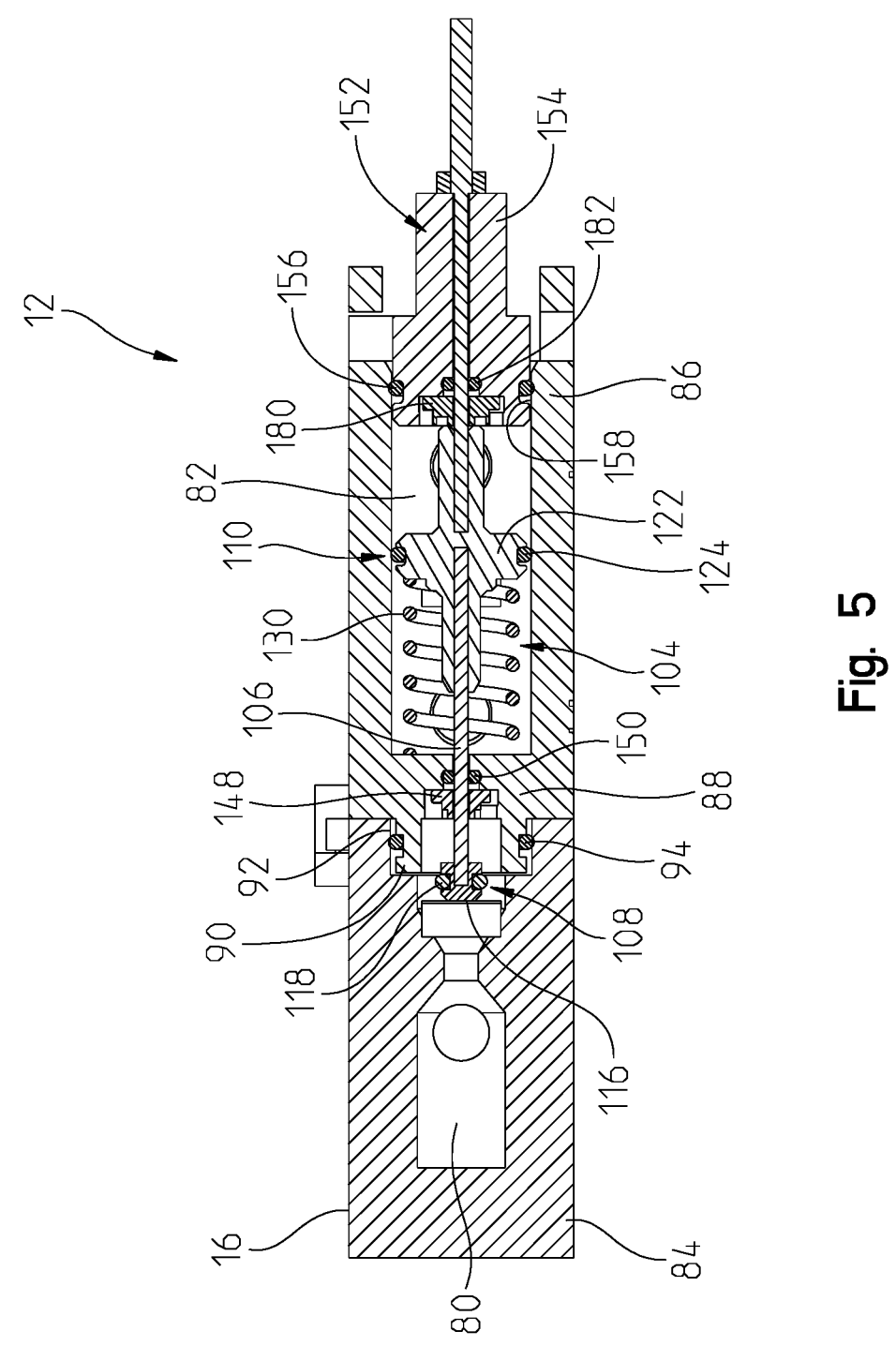
FIG. 5 is a cross-sectional view taken along line 5-5 of FIG. 3, showing the valve piston assembly in the first position of FIG. 4A.

With reference to FIGS. 3-5, the diverter body 16 of the water diverter device 12 illustratively includes a hot water chamber 80 and a cold water chamber 82. The diverter body 16 may be formed by a first housing portion 84 coupled to a second housing portion 86, wherein the hot water chamber 80 is defined by the first housing portion 84, and the cold water chamber 82 is defined by the second housing portion 86. A partition or wall 88, illustratively formed by the second housing portion 86, separates the hot water chamber 80 from the cold water chamber 82. Illustratively, a cylindrical projection or boss 90 of the housing portion 86 is received within an opening or bore 92 of the first housing portion 84.

An annular seal 94, such as an o-ring, forms a fluid seal between the first housing portion 84 and the second housing portion 86.

Figure 6:
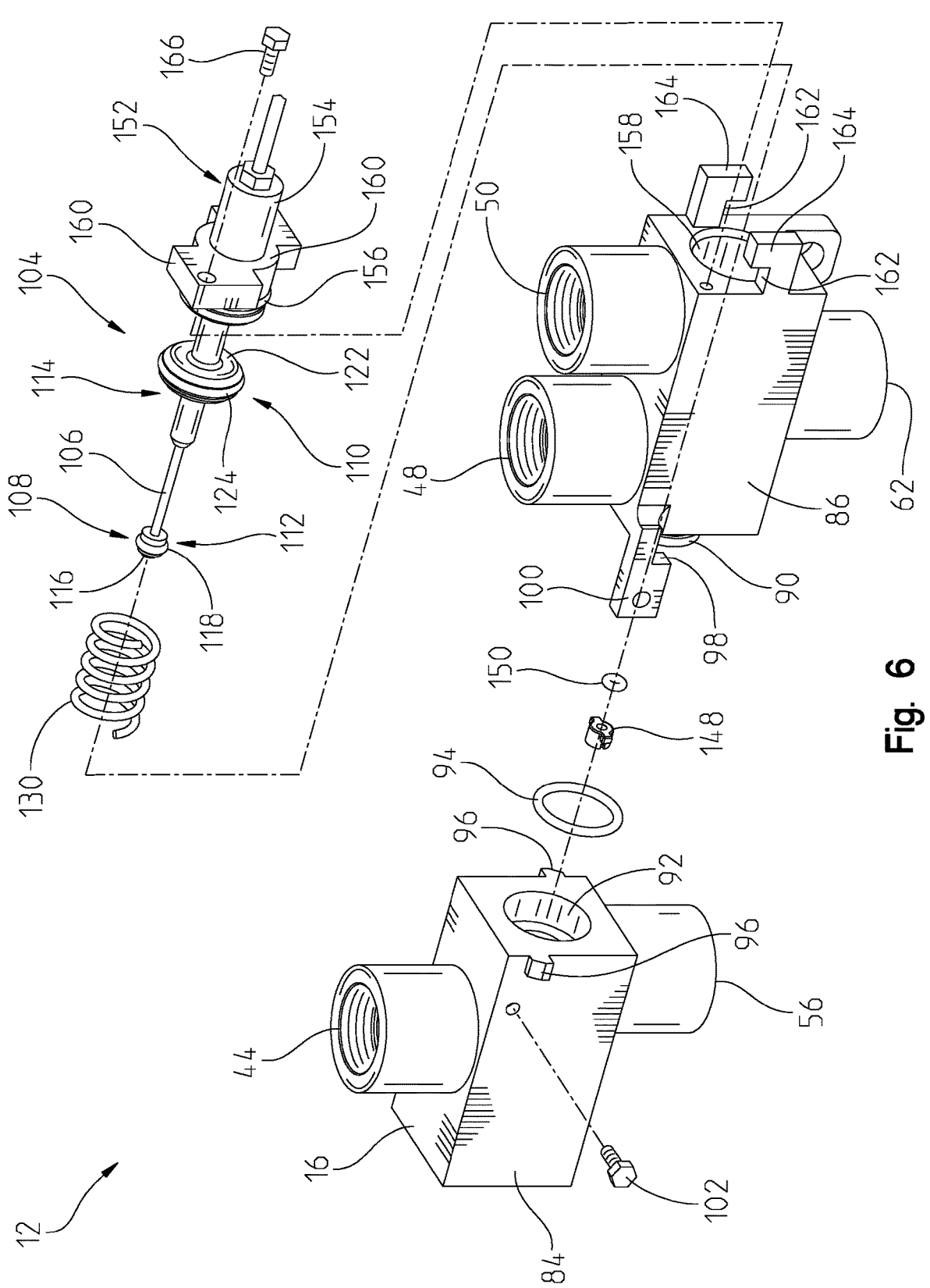
FIG. 6 is a partially exploded perspective view of the water diverter device of FIG. 3.

With reference to FIGS. 3 and 6, the first housing portion 84 may include tabs 96 received within notches 98 formed within outwardly extending latches 100 of the second housing portion 86 to rotationally orient the first and second housing portions 84 and 86. The latches 100 of the second housing portion 86 may be secured to the first housing portion 84 via fasteners 102.

The hot water chamber 80 is in fluid communication with the third port 55 defining the hot water inlet 56, and the first port 43 defining the hot water outlet 44. The cold water chamber 82 is in fluid communication with the fourth port 61 defining the cold water inlet 62, the second port 47 defining the cold water outlet 48, and the fifth port 71 defining the filter water outlet 50. A valve piston assembly 104 is received within the diverter body 16 and is operably coupled to the actuator 24. More particularly, the valve piston assembly 104 extends between the hot water chamber 80 and the cold water chamber 82.

The valve piston assembly 104 controls whether incoming cold water from the cold water inlet 62 goes straight through to the water outlet 30 of the faucet 14 (via the cold water outlet 48), or is routed through the filter device 70 (via the filter water outlet 50). The valve piston assembly 104 is moveable between a first position defining the normal or default mode of operation (FIG. 4A), and a second position (FIG. 4B) defining the filter mode of operation.

More particularly, in the first position of the valve piston assembly 104 as shown in FIG. 4A: (1) the hot water inlet 56 is in fluid communication with the hot water outlet 44, (2) the hot water inlet 56 is blocked from the cold water outlet 48 and the filter water outlet 50, (3) the cold water inlet 62 is in fluid communication with the cold water outlet 48, and (4) the cold water inlet 62 is blocked from the hot water outlet 44 and the filter water outlet 50. In the second position of the valve piston assembly 104 as shown in FIG. 4B: (1) the hot water inlet 56 is blocked from the hot water outlet 44 (with the exception of an optional weep hole to allow pressure to equalize once the water flow is turned off), the cold water outlet 48, and the filter water outlet 50, (2) the cold water inlet 62 is blocked from the hot water outlet 44 and the cold water outlet 48, and (3) the cold water inlet 62 is in fluid communication with the filter water outlet 50.

With reference to FIGS. 4A-6, the valve piston assembly 104 illustratively includes a shaft or rod 106 supporting a hot water valve member or piston 108 and a cold water valve member or piston 110. The hot water valve member 108 is movably received within the hot water chamber 80, and the cold water valve member 110 is movably received within the cold water chamber 82. Illustratively, a distal end 112 of the shaft 106 is secured to the hot water valve member 108, while a proximal end 114 of the shaft 106 is secured to the cold water valve member 110. The hot water valve member 108 illustratively includes a disc 116 supporting an annular seal 118 configured for selective engagement with a hot water valve seat 120. Similarly, the cold water valve member 110 illustratively includes a disc 122 supporting an annular seal 124 configured for selective engagement with a first cold water valve seat 126 and a second cold water valve seat 128. A biasing member 130, illustratively a spring, is operably coupled to the shaft 106 and biases the valve piston assembly 104 in a proximal direction toward the first position (FIG. 4A). At least one weep hole may be provided in or around the hot water valve member 108 to provide limited hot water flow across the hot water valve member 108 in the second position of the valve piston assembly 104 to prevent the piston assembly 104 from becoming hydraulically trapped in the second position.

With further reference to FIG. 4A, in the illustrative first position of the valve piston assembly 104, the annular seal 124 sealingly engages the first cold water valve seat 126 defining a cold water flow passageway 132 through the cold water chamber 82 such that cold water enters the fourth port 61 defining the cold water inlet 62 (shown by arrow 134) and exits the second port 47 defining the cold water outlet 48 (shown by arrow 136), while preventing fluid communication between the fourth port 61 defining the cold water inlet 62 and the fifth port 71 defining the filter water outlet 50. Simultaneously, the annular seal 118 of the hot water valve member 108 is spaced apart from the hot water valve seat 120 defining a hot water flow passageway 138 through the hot water chamber 80 such that hot water enters the third port 55 defining the hot water inlet 56 (shown by arrow 140) and exits the first port 43 defining the hot water outlet 44 (shown by arrow 142).

With further reference to FIG. 4B, in the illustrative second position of the valve piston assembly 104, the annular seal 124 sealingly engages the second cold water valve seat 128 defining a filter water flow passageway 144 through the cold water chamber 82 such that cold water enters the fourth port 61 defining the cold water inlet 62 (shown by arrow 134) and exits the fifth port 71 defining the filter water outlet 50 (shown by arrow 146). Simultaneously, the annular seal 118 sealing engages the hot water valve seat 120 thereby preventing unfiltered hot water flow through the hot water chamber 80 and, more particularly, to the first port 43 defining the hot water outlet 44 and, thereby, from entering the mixing valve 32 and mixing with the filtered water coming from the filter 70.

With reference to FIGS. 5 and 6, the shaft 106 of the valve piston assembly 104 extends through the wall 88 separating the hot water chamber 80 and the cold water chamber 82. An o-ring 150 illustratively provide a sliding seal between the wall 88 and the shaft 106, and is held in place by a retainer 148.

A coupler 152 is received within the second housing portion 86 to seal a proximal end of the cold water chamber 82. Illustratively, the coupler 152 may include a cylindrical plug 154 supporting a seal 156, such as an o-ring sealingly received within a bore 158 of the second housing portion 86.

Figure 8:
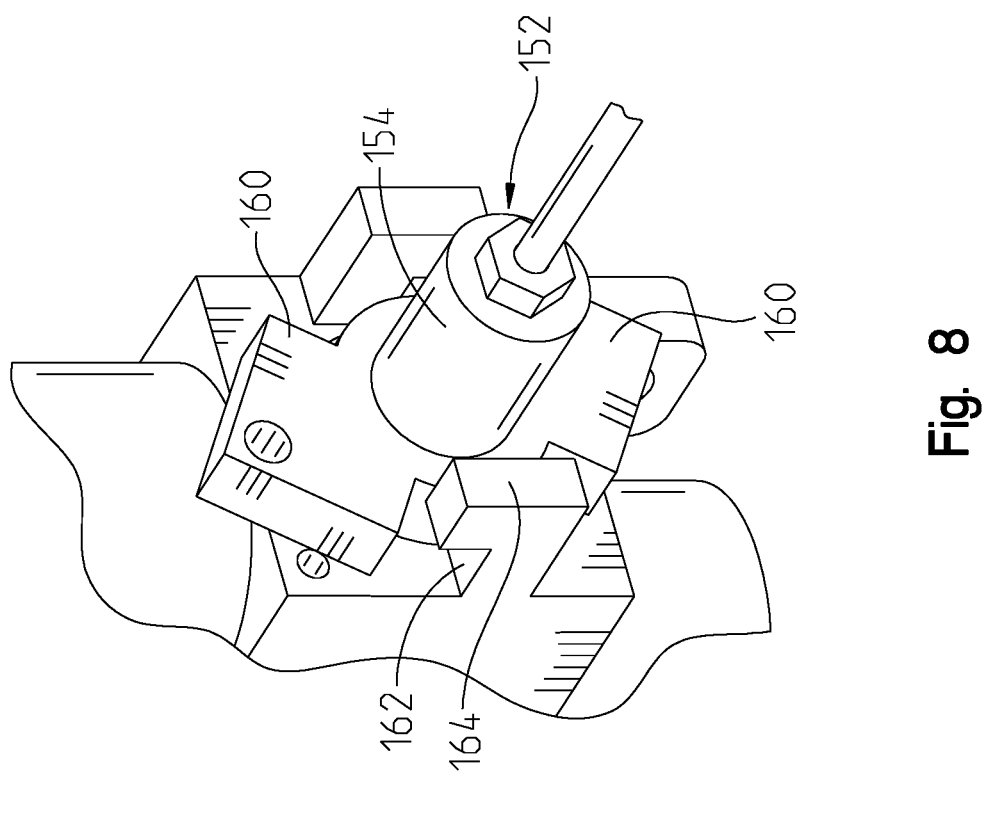
FIG. 8 is a perspective view similar to FIG. 7, showing the valve piston assembly in a second partially assembled position.
Figure 7:
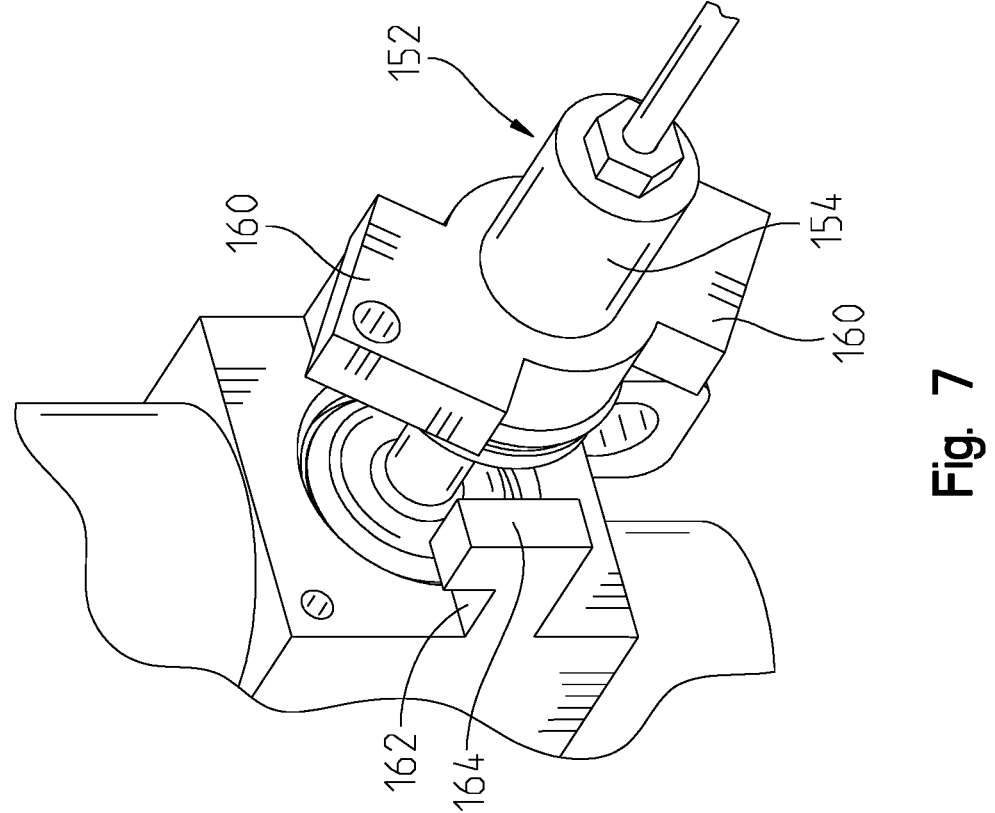
FIG. 7 is a perspective view of a proximal end of the water diverter device of FIG. 3, showing the valve piston assembly in a first partially assembled position.
Figure 9:
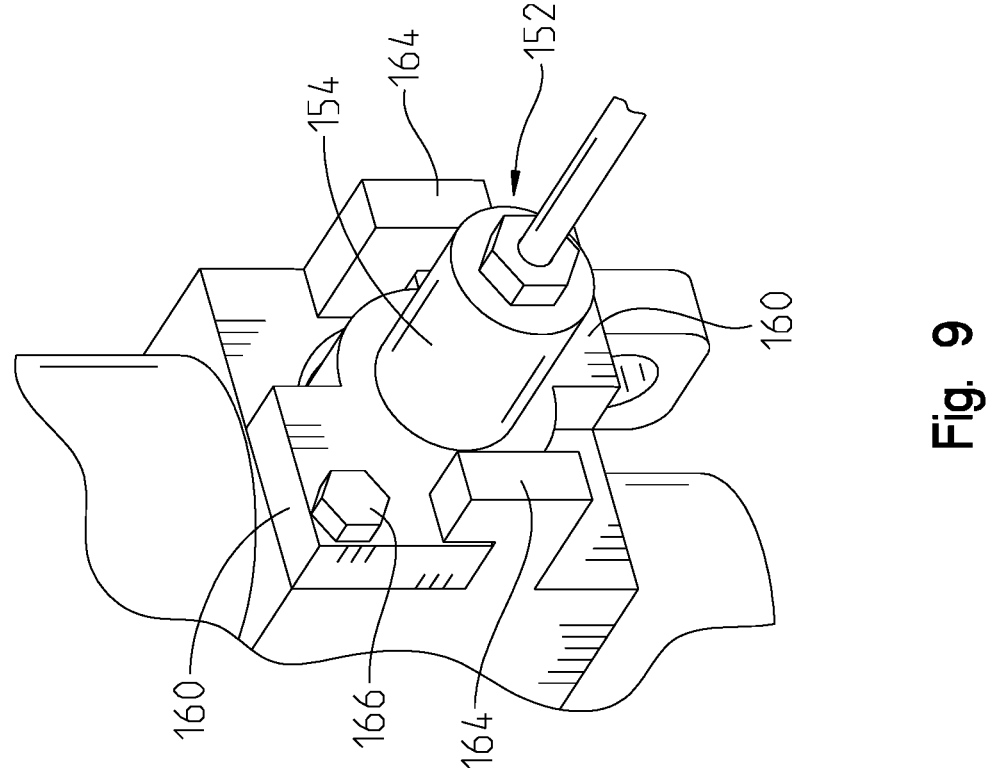
FIG. 9 is another perspective view similar to FIG. 7, showing the valve piston assembly in a fully assembled position.

FIGS. 7-9 illustrate assembly of the valve piston assembly 104 to the diverter body 16 by being received with the cold water chamber 82 and the hot water chamber 80. Radially outwardly extending protrusions, illustratively mounting blocks 160, of the coupler 152 are received within notches 162 formed within arms 164 extending outwardly from the second housing portion 86 of the diverter body 16. FIG. 7 is a perspective view of a proximal end of the water diverter device 12, showing the valve piston assembly 104 in a first partially assembled position. FIG. 8 is a perspective view similar to FIG. 7, showing the valve piston assembly 104 in a second partially assembled position. FIG. 9 is another perspective view similar to FIG. 7, showing the valve piston assembly 104 in a fully assembled position with fasteners 166 securing the mounting blocks 160 to the second housing portion 86.

With reference to FIGS. 2-4B, the actuator 24 is operably coupled to the valve piston assembly 104 to control movement thereof. The user interface 22 is operably coupled to the actuator 24 where input to the user interface 22 causing the actuator 24 to move the valve piston assembly 104. Illustratively, the user interface 22 includes a push button

168, and the actuator 24 includes a flexible inner cable 170 slidably received within a flexible outer sheath 172. A first end 174 of the inner cable 170 is coupled to the push button 168, and a second end 176 of the inner cable 170 is coupled to the proximal end 114 of the shaft 106 (e.g., the cold water valve member 110) of the valve piston assembly 104. Depressing the push button 168 pushes the inner cable 170 to move the valve piston assembly 104 (illustratively to the left from the position shown in FIG. 4A to the position shown by arrow 178 in FIG. 4B). The cable 170 is illustratively slidably received within a gasket 180 and annular seal 182, illustratively an o-ring, supported by the cylindrical plug 154.

In other illustrative embodiments, the user interface 22 may comprise other suitable devices, such as electrical switches, remote transmitters, etc. Similarly, the actuator 24 may comprise other devices to move the valve piston assembly 104, such as electric motors, hydraulic actuators, etc.

In operation, the valve piston assembly 104 of the water diverter device 12 is initially in the default or normal mode of operation as shown in FIGS. 4A and 5, where the hot water inlet 56 of the water diverter device 12 is in fluid communication with the water outlet 30 via the mixing valve 32 and the hot water outlet 44 of the water diverter device 12, the cold water inlet 62 of the water diverter device 12 is in fluid communication with the water outlet 30 via the mixing valve 32 and the cold water outlet 48 of the water diverter device 12, and the cold water inlet 62 of the water diverter device 12 is blocked from the filter water outlet 50 of the water diverter device 12.

By a user depressing the push button 160, the cable 168 pushes the valve piston assembly 104 to the filter mode of operation of FIG. 4B, where the hot water inlet 56 of the water diverter device 12 is blocked from the hot water outlet 44 of the water diverter device 12, the cold water inlet 62 of the water diverter device 12 is blocked from the cold water outlet 48 of the water diverter device 12, and the cold water inlet 62 is in fluid communication with the water outlet 30 via the mixing valve 32 and the filter water outlet 50 of the water diverter device 12. Water pressure within the passageway 144 maintains the valve piston assembly 104 in the filter mode of operation. Once water flow is stopped, then the spring 130 returns the valve piston assembly 104 to the default position of FIG. 4A.

Figure 10:
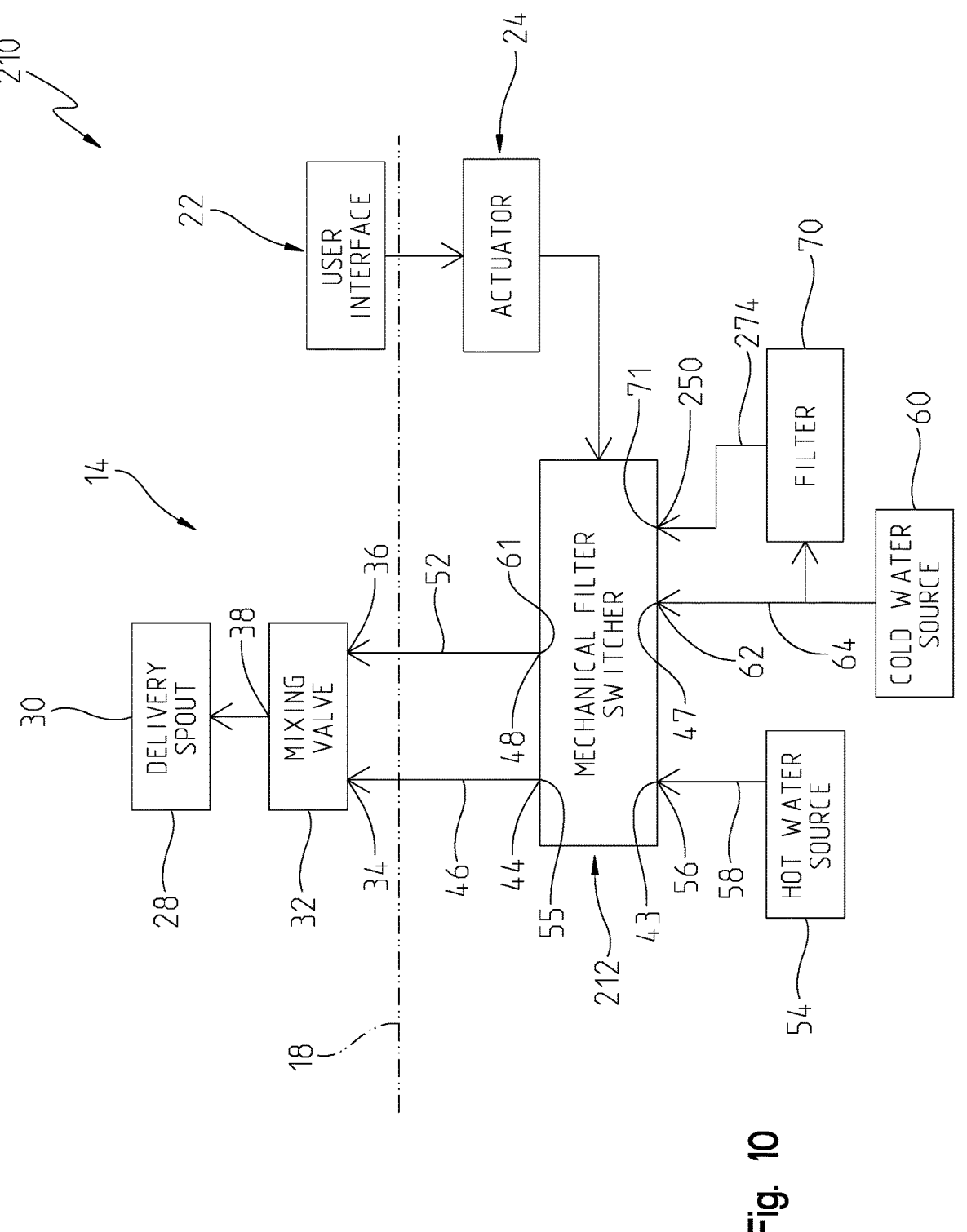
FIG. 10 is a block diagram of another illustrative water filtration system of the present disclosure.
Figure 11:
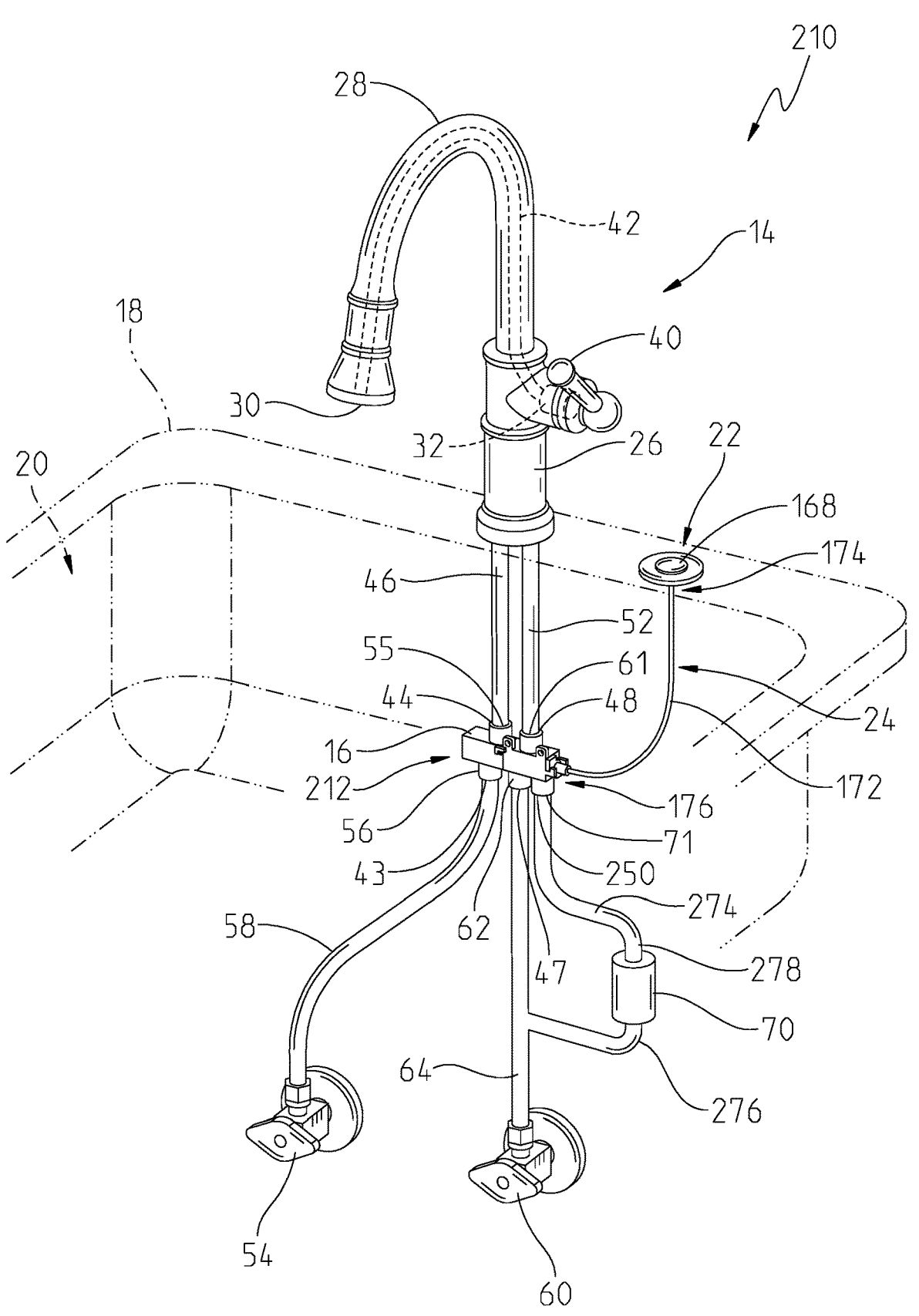
FIG. 11 is a perspective view of the water filtration system of FIG. 10, showing a mounting deck and a sink basin in phantom.

With reference now to FIGS. 10 and 11, a further illustrative water filtration system 210 of the present disclosure includes a water diverter device 212 for use with the faucet 14. The water filtration system 210 includes many features similar to those detailed above in connection with the water filtration system 10. As such, in the following detailed description, like reference numbers are used to identify similar components.

In the illustrative water filtration system 210, the diverter body 16 of the water diverter device 212 is inverted (i.e., rotated 180 degrees about its longitudinal (horizontal) axis) from the diverter device 12 shown in FIGS. 1 and 2. In other words, the diverter body 16 is rotated 180 degrees about the valve piston assembly 104. As such, the hot water inlet port 34 of the mixing valve 32 is fluidly coupled to the third port 55 of the diverter body 16 (defining the hot water outlet 44) via the first connection tube 46, and the cold water inlet port 36 of the mixing valve 32 is fluidly coupled to the fourth port 61 of the diverter body 16 (defining the cold water outlet 48) via the second connection tube 52. The hot water source 54 is fluidly coupled to the first port 43 of the diverter body 16 (defining the hot water inlet 56) via a hot water supply tube

58, and the cold water source 60 is fluidly coupled to the second port 47 of the diverter body 16 (defining the cold water supply tube 62) via the cold water supply tube 64.

Illustratively, the water filter device 70 is in fluid communication upstream from the diverter device 212. More particularly, the water filter device 70 is in selective fluid communication with the fifth port 71 of the diverter body 16 (defining a filter water port or inlet 250 of the diverter device 212) via a bypass filter line 274, such that the water filter device 70 is fluidly coupled in series between the cold water source 60 and the diverter device 212. The bypass filter line 274 is illustratively in parallel with the cold water supply tube 64 and includes an upstream tube portion 276 and a downstream tube portion 278 fluidly coupled to opposing ends of the water filter device 70. More particularly, the upstream tube portion 276 is fluidly coupled to the cold water source 60, and the downstream tube portion 278 is fluidly coupled to the filter water inlet 250 of the diverter body 16.

Although the invention has been described in detail with reference to certain preferred embodiments, variations and modifications exist within the spirit and scope of the invention as described and defined in the following claims.

The invention claimed is:

1. A water diverter device comprising:
   a diverter body including a hot water chamber, a cold water chamber blocked from the hot water chamber, a hot water inlet in fluid communication with the hot water chamber, a hot water outlet in fluid communication with the hot water chamber, a cold water inlet in fluid communication with the cold water chamber, a cold water outlet in fluid communication with the cold water chamber, and a filter water port in fluid communication with the cold water chamber;
   a valve piston assembly including a hot water valve member and a cold water valve member, the hot water valve member received within the hot water chamber, and the cold water valve member received within the cold water chamber;
   an actuator operably coupled to the valve piston assembly; and
   a user interface operably coupled to the actuator, wherein input to the user interface causes the actuator to move the valve piston assembly.

2. The water diverter device of claim 1, wherein in a filter mode of operation of the valve piston, the cold water valve member permits fluid communication between the cold water inlet and the filter water port, the cold water valve member blocks the cold water outlet from the cold water inlet, and the hot water valve member blocks the hot water outlet from the hot water inlet.

3. The water diverter device of claim 1, wherein in a filter mode of operation of the valve piston, the cold water valve member permits fluid communication between the filter water port and the cold water outlet, the cold water valve member blocks the cold water outlet from the cold water inlet, and the hot water valve member blocks the hot water outlet from the hot inlet.

4. The water diverter device of claim 1, wherein the valve piston assembly includes:
   a first position wherein the hot water inlet is in fluid communication with the hot water outlet, the cold water inlet is in fluid communication with the cold water outlet, and the cold water inlet is blocked from the filter water port; and
   a second position wherein the hot water inlet is blocked from the hot water outlet, the cold water inlet is blocked from the cold water outlet, and the cold water inlet is in fluid communication with the filter water port.

5. The water diverter device of claim 4, wherein the valve piston assembly is biased toward the first position.

6. The water diverter device of claim 1, wherein the valve piston assembly includes:

a first position wherein the hot water inlet is in fluid communication with the hot water outlet, the cold water inlet is in fluid communication with the cold water outlet, and the cold water inlet is blocked from the filter water port; and a second position wherein the hot water inlet is blocked from the hot water outlet, the cold water inlet is blocked from the cold water outlet, and the filter water port is in fluid communication with the cold water outlet.

7. The water diverter device of claim 1, wherein the actuator comprises a flexible cable, and the user interface comprises a button configured to move the flexible cable.

8. The water diverter device of claim 1, further comprising a faucet delivery spout including a faucet outlet, wherein the hot water outlet, the cold water outlet, and the filter water port are fluidly coupled to the faucet outlet.

9. The water diverter device of claim 8, further comprising a water filter fluidly coupled in series between the filter water port and the faucet outlet.

10. The water diverter device of claim 1, further comprising a mixing valve fluidly coupled in series downstream from the hot water outlet and the cold water outlet of the diverter body, and upstream from the faucet outlet.

11. The water diverter device of claim 1, wherein the valve piston assembly includes a shaft extending axially between a proximal end and a distal end, the hot water valve member includes an annular seal supported by the shaft, the cold water valve member includes an annular seal support by the shaft in axially spaced relation to the annular seal of the hot water valve member.

12. The water diverter device of claim 11, further comprising a biasing element operably coupled to the shaft to bias the valve member in a proximal direction, and wherein the actuator is coupled to the proximal end of the shaft to move the valve member in a distal direction.

13. A water diverter device comprising:

a diverter body including a hot water inlet, a hot water outlet in selective fluid communication with the hot water inlet, a cold water inlet, a cold water outlet in selective fluid communication with the cold water inlet, and a filter water outlet in selective fluid communication with the cold water inlet; and a valve piston assembly including:

a first position wherein the hot water inlet is in fluid communication with the hot water outlet, the cold water inlet is in fluid communication with the cold water outlet, and the cold water inlet is blocked from the filter water outlet, and a second position wherein the hot water inlet is blocked from the hot water outlet, the cold water inlet is blocked from the cold water outlet, and the cold water inlet is in fluid communication with the filter water outlet.

14. The water diverter device of claim 13, wherein the diverter body includes:

a hot water chamber in fluid communication with the hot water inlet and the hot water outlet; and a cold water chamber in fluid communication with the cold water inlet, the cold water outlet and the filter water outlet.

15. The water diverter device of claim 14, wherein the valve piston assembly includes a hot water valve member and a cold water valve member, the hot water valve member received within the hot water chamber, and the cold water valve member received within the cold water chamber.

16. The water diverter device of claim 15, wherein the valve piston assembly includes a shaft extending axially between a proximal end and a distal end, the hot water valve member includes an annular seal supported by the shaft, the cold water valve member includes an annular seal support by the shaft in axially spaced relation to the annular seal of the hot water valve member.

17. The water diverter device of claim 16, further comprising a biasing element operably coupled to the shaft to bias the valve member in a proximal direction, and wherein the actuator is coupled to the proximal end of the shaft to move the valve member in a distal direction.

18. The water diverter device of claim 16, wherein in the second position of the valve piston assembly, the cold water valve member permits fluid communication between the cold water inlet and the filter water outlet, the cold water valve member blocks the cold water inlet from the cold water outlet, and the hot water valve member blocks the hot water outlet from the hot water inlet.

19. The water diverter device of claim 13, further comprising:

an actuator operably coupled to the valve piston assembly; and a user interface operably coupled to the actuator wherein input to the user interface causes the actuator to move the valve piston assembly from the first position to the second position.

20. The water diverter device of claim 19, wherein the actuator comprises a flexible cable, and the user interface comprises a button configured to move the flexible cable.

21. The water diverter device of claim 13, further comprising a faucet delivery spout including a faucet outlet, wherein the hot water outlet, the cold water outlet, and the filter water outlet are fluidly coupled to the faucet outlet.

22. The water diverter device of claim 21, further comprising a water filter fluidly coupled in series between the filter water outlet and the faucet outlet.

23. The water diverter device of claim 22, further comprising a mixing valve fluidly coupled in series downstream from the hot water outlet and the cold water outlet, and upstream from the faucet outlet.

24. The water diverter device of claim 13, wherein the valve piston assembly is biased toward the first position.

25. A faucet comprising:

a delivery spout including a faucet outlet;

a diverter body including a hot water inlet, a hot water outlet in selective fluid communication with the hot water inlet, a cold water inlet, a cold water outlet in selective fluid communication with the cold water inlet, and a filter water outlet in selective fluid communication with the cold water inlet;

a valve piston assembly including:

a first position wherein the hot water inlet is in fluid communication with the hot water outlet, the cold water inlet is in fluid communication with the cold water outlet, and the cold water inlet is blocked from the filter water outlet, and a second position wherein the hot water inlet is blocked from the hot water outlet, the cold water inlet is blocked from the cold water outlet, and the cold water inlet is in fluid communication with the filter water outlet;

wherein the hot water outlet, the cold water outlet, and the filter water outlet are fluidly coupled to the faucet outlet;

an actuator operably coupled to the valve piston assembly;

a user interface operably coupled to the actuator wherein input to the user interface causes the actuator to move the valve piston assembly; and a water filter fluidly coupled between the filter water outlet and the faucet outlet.

26. The faucet of claim 25, wherein the diverter body includes:

a hot water chamber in fluid communication with the hot water inlet and the hot water outlet; and a cold water chamber in fluid communication with the cold water inlet, the cold water outlet and the filter water outlet.

27. The faucet of claim 26, wherein the valve piston assembly includes a hot water valve member and a cold water valve member, the hot water valve member received within the hot water chamber, and the cold water valve member received within the cold water chamber.

28. The faucet of claim 27, wherein in the second position of the valve piston assembly, the cold water valve member permits fluid communication between the cold water inlet and the filter water outlet, the cold water valve member blocks the cold water inlet from the cold water outlet, and the hot water valve member blocks the hot water outlet from the hot water inlet.

29. The faucet of claim 27, wherein the valve piston includes a shaft extending axially between a proximal end and a distal end, the hot water valve member includes an annular seal supported by the shaft, the cold water valve member includes an annular seal support by the shaft in axially spaced relation to the annular seal of the hot water valve member.

30. The faucet of claim 25, wherein the actuator comprises a flexible cable, and the user interface comprises a button configured to move the flexible cable.

31. The faucet of claim 25, further comprising a mixing valve fluidly coupled in series downstream from the hot water outlet and the cold water outlet, and upstream from the faucet outlet.

32. The faucet of claim 25, wherein the valve piston assembly is biased toward the first position.

33. A water diverter device comprising:

a diverter body including a hot water chamber, a hot water inlet in fluid communication with the hot water chamber, a hot water outlet in fluid communication with the hot water chamber, a cold water chamber, a cold water inlet in fluid communication with the cold water chamber, a cold water outlet in fluid communication with the cold water chamber, and a filter water port in fluid communication with the cold water chamber;

a valve piston assembly including a cold water valve member received within the cold water chamber;

an actuator operably coupled to the valve piston assembly;

a user interface operably coupled to the actuator, wherein input to the user interface causes the actuator to move the valve piston assembly;

wherein the valve piston assembly includes:

a first position wherein the cold water inlet is in fluid communication with the cold water outlet, the hot water inlet is in fluid communication with the hot water outlet, and the filter water port is blocked from the cold water inlet, the cold water outlet and the hot water inlet; and a second position wherein the cold water inlet is blocked from the cold water outlet, and the hot water inlet is blocked from the hot water outlet; and wherein the valve piston assembly is biased toward the first position.

34. The water diverter device of claim 33, wherein in the second position the cold water inlet is in fluid communication with the filter water port.

35. The water diverter device of claim 33, wherein the second position the filter water port is in fluid communication with the cold water outlet.

36. The water diverter device of claim 33, wherein the actuator comprises a flexible cable, and the user interface comprises a button configured to move the flexible cable.

37. The water diverter device of claim 33, further comprising a faucet delivery spout including a faucet outlet, wherein the cold water outlet, and the filter water port are fluidly coupled to the faucet outlet.

38. The water diverter device of claim 37, further comprising a water filter fluidly coupled in series between the filter water port and the faucet outlet.

39. The water diverter device of claim 33, wherein the valve piston assembly includes a shaft extending axially between a proximal end and a distal end, and the cold water valve member includes an annular seal positioned intermediate the proximal end and the distal end.

40. The water diverter device of claim 39, further comprising a biasing element operably coupled to the shaft to bias the valve member in a proximal direction, and wherein the actuator is coupled to the proximal end of the shaft to move the valve member in a distal direction.

\* \* \* \* \*